United States Patent [19]

Mizushima et al.

[11] Patent Number: 5,328,236
[45] Date of Patent: Jul. 12, 1994

[54] SIDE SUPPORT DEVICE IN SEAT BACK OF AN AUTOMOTIVE SEAT

[75] Inventors: Yoshihiro Mizushima; Akira Aoki, both of Akishima, Japan

[73] Assignee: Tachi-S Col. Ltd., Akishima, Japan

[21] Appl. No.: 953,657

[22] Filed: Sep. 29, 1992

[51] Int. Cl.⁵ .............................................. A47C 3/00
[52] U.S. Cl. ................... 297/284.9; 297/284.4
[58] Field of Search ..................... 297/284.9, 284.4

[56] References Cited

U.S. PATENT DOCUMENTS

| | | | |
|---|---|---|---|
| 4,537,444 | 8/1985 | Maruyama et al. | 297/284.9 |
| 4,636,000 | 1/1987 | Nishino . | |
| 4,679,855 | 7/1987 | Hattori et al. | 297/284.9 X |
| 4,924,163 | 5/1990 | Sakamoto et al. | 297/284.9 X |
| 5,174,629 | 12/1992 | Mizushima | 297/284.4 |

FOREIGN PATENT DOCUMENTS

| | | | |
|---|---|---|---|
| 60-97634 | 7/1985 | Japan . | |
| 0037544 | 2/1986 | Japan | 297/284.9 |
| 2-143061 | 12/1990 | Japan . | |

*Primary Examiner*—Michael F. Trettel
*Attorney, Agent, or Firm*—Oldham, Oldham, & Wilson Co.

[57] ABSTRACT

A side support device in a seat back of an automotive seat, which is mounted at one lateral frame section of a seat back frame within the seat back, is of such a structure that a motor and associated transmissions are disposed adjacently along the inward side of that one lateral frame section of seat back frame, and that a drive mechanism is also disposed along the same one lateral frame section of seat back frame for causing a pair of side support frames to be moved inwardly toward and outwardly away from each other. The drive mechanism includes a lead screw and a nut member in threaded engagement therewith, such that both of them are disposed vertically relative to the seat back frame. Thus, the motor, drive mechanism and related elements are located in the seat back at a point free from contact with the body of a passenger on the seat.

4 Claims, 2 Drawing Sheets

SIDE SUPPORT DEVICE IN SEAT BACK OF AN AUTOMOTIVE SEAT

BACKGROUND OF INVENTION

1. Field of the Invention

The present invention relates to a side support device in the seat back of an automotive seat.

2. Description of Prior Art

In conventional side support device provided in the seat back of automotive seat, several transmission systems, including a threaded lead screw and threaded nut system, link members and shafts, are arranged in the seat back frame so as to transmit and transform the rotational drive force of an electric motor into the inward and outward swinging motion of both side support frames upon the respective lateral frame sections of seat back frame. Namely, the two side support frames are rotatably supported on those respective lateral frame sections of seat back frame, such that both side support frames are simultaneously rotatable about their respective lateral frame sections of seat back frame in the direction inwardly and outwardly of the seat back frame in order to permit adjustment of side support force to both sides of an occupant sitting on the seat. In this side support framework, some transmission systmes mentioned above and relevant mechanic elements are conventionally disposed in a manner projecting inwardly of those two side support frames. This is known, for example, from the Japanese Utility Model Laid-Open Pubs. Nos. 60-97634 and 2-143061, which show the transmission systems (gears, motor support brackets, shafts, threaded lead screw, threaded nut in mesh with the threaded lead screw, etc.) to be disposed inwardly of the seat back frame in a manner projecting forwardly of same seat back frame. Incidentally, a foam padding, which covers those side support frames, seat back frame and transmission systems, is normally of a thin thickness as compared with the thickness of foam padding used on the seat cushion frame. Such seat back structures with side support device has been found defective in that the tramission systems and associated mechanic elements noted above are felt hard by the back of an occupant sitting on the seat, and thus, the occupant may not enjoy a comfortable support touch on the seat back.

SUMMARY OF THE INVENTION

In view of the above-stated drawbacks, it is therefore a purpose of the present invention to provide a side support device in a seat back of an automotive seat, which avoids an undesired hard touch of mechanic elements in the side support portions of seat back.

To attain this purpose, a side support device in accordance with the present invention is basically comprised of a seat back frame having a pair of lateral frame sections, a pair of side support frames, each being rotatably mounted on the respective pair of lateral frame sections of the seat back frame, a drive mechanism disposed at one of such pair of lateral frame sections, which drive mechanism includes a motor; a lead screw connected with the motor; the lead screw extending generally vertically relative to the foregoing one of lateral frame sections; a nut member in a threaded engagement with the lead screw; the nut member having a pin; an arm means whose one end is engaged with the pin of nut member; a first bracket fixed on the foregoing one of lateral frame sections; and a shaft rotatably supported on the first bracket, with another end of the arm means being fixed to the shaft, a link means whose base end is fixed to the shaft, a second bracket fixed on the same foregoing one of lateral frame sections, and actuator plate which is rotatably supported on the second bracket, the actuator plate having one end portion coupled operatively to a free end of the link means and having another opposite end portion to which one end of one of the pair of side support frames is fixed, and a connecting rod extended between the two side support frames, the connecting rod having one end pivotally connected to the foregoing another end portion of actuator plate and having another end operatively connected to another of the two side support frames.

Accordingly, the drive mechanism is disposed adjacently at one of the two lateral frame sections of seat back frame and the lead screw extends vertically therefrom, which locates all the mechanic elements within the side support portion of seat back, thereby preventing those elements to be felt hard by the back of an occupant on the seat.

Preferably, the first and second brackets may be disposed alongside of the inward surface of the foregoing one of lateral frame sections, and the shaft extend above and along that particular one of lateral frame sections for fixation to the base end of the link means stated above.

DETAILED DESCRIPTION OF PREFERRED EMBODIMENT OF THE INVENTION

Referring to FIGS. 1 through 4, there is shown a side support device provided on a seat back frame (F) in accordance with the present invention.

The side support device is basically comprised of a pair of side support frames (10A) (10B), an electric motor (M), transmission systems (B, 2, 3, 4, 5, 6, 7) and a connecting rod (9).

Figure 1:
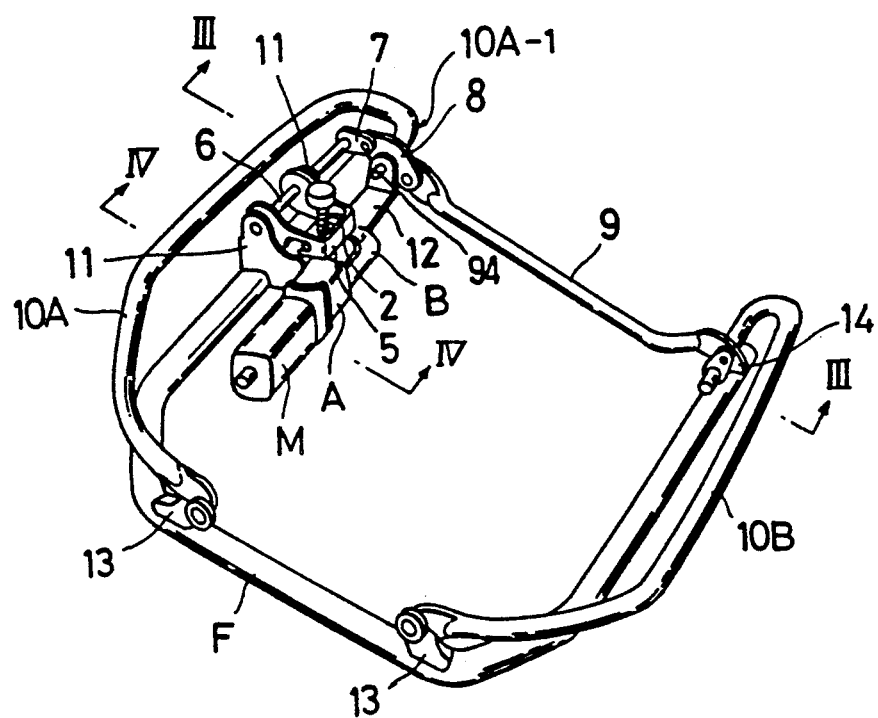
FIG. 1 is a perspective view of a side support device in accordance with the present invention, which is provided on a seat back frame.

As viewed from FIG. 1, the seat back frame (F) is formed generally in a U-shaped configuration having a horizontal frame section and a pair of lateral frame sections extending vertically from the respective ends of the horizontal frame section.

As also viewed from FIG. 1, the right-side side support frame (10A) is rotatably supported on one corresponding lateral frame section of the seat back frame (F) by means of a bracket (13) and a second base bracket (12), whereas the left-side side support frame (10B) is likewise supported on another corresponding lateral frame section of seat back frame (F) by means of brackets (13)(14).

The electric motor (M) is supported by a pair of first base brackets (11) (11) and the foregoing second base bracket (12). The output shaft of motor (M1) is connected via a reduction gear (A) with a gear box (B). Those reduction gear (A) and gear box (B) are also supported by the two base brackets (11) (12).

Figure 2:
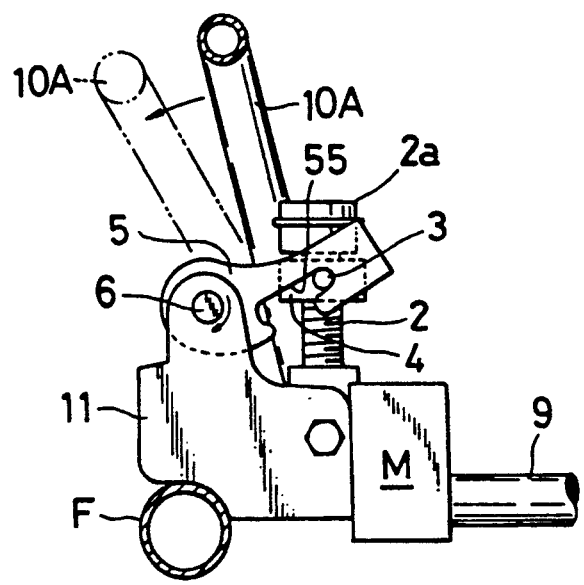
FIG. 2 is a partially sectional view of a principal part of the present invention.

Projected upwardly from the gear box (B) is a lead screw (2). Although not shown, the lower end of such lead screw (2) is operatively connected with a gear in the gear box (B), so that the output of motor (M) is transmitted to the lead screw (4) for rotation. A nut member (4) is in a threaded engagement with the lead screw (2), as shown in FIG. 2. Hence, operation of the motor (M) results in the lead screw (2) being rotated, which in turn causes a vertical displacement of the nut member (4) along the longitudinal axis of lead screw (2). The nut member (4) is provided with a pin (3).

A generally U-shaped arm (5) is rotatably supported, at its both ends, on the respective upper ends of foregoing two first base brackets (11) (11). As best shown in FIG. 2, one lateral arm section of the arm (5) is formed with a notched portion (55) in which is engaged the abovementioned pin (3) of the nut member (4), whereby the vertical movement of the nut member (4) along the lead screw (2) causes upward and downward rotation of the arm (5) about its center of rotation at (6), as can be seen from both FIGS. 2 and 4.

Excepting the seat back frame (F) and two side support frames (10A) (10B), all the above-described transmission parts designated by (B), (2), (4), (3), (5), and (11) are a known small-sized transmission system disclosed in the U.S. patent application No. 794, 415, now U.S. Pat. No. 5,174,629, which presents an effective means for solving the same problems as set forth in the prior art description above, only in respect of a lumbar support device, not the side support device. For details in this regard, reference should be made to that U.S. patent application.

Designation (6) represents a shaft which passes rotatably through the upper end portions respectively of the first base brackets (11) (11). As understandable from FIG. 1, the ends of arm (5) are fixed on that shaft (6), and therefore, the upward and downward rotation of the arm (5) as above is transformed into a rotation of the shaft (6) per se. The free end portion of shaft (6) extends from the first base bracket (11), alongside of the lateral frame section back frame (F), towards a link piece (7). Otherwise stated, such outwardly extended free end portion of shaft (6) is fixed to one end of the link piece (7). Another end of of this link piece (7) is pivotally connected with one lateral end of an actuator plate (8).

The actuator plate (8) has a pin (94) fixed at its central point, and the pin (94) is rotatably supported by the second base bracket (12). As viewed from FIG. 1, the second base bracket (12) is fixed on the inward surface of right-side lateral frame section of seat back frame (F), and thus, upon that second base bracket (12), the actuator plate (8) is free to rotate about the central axis of pin (94).

Figure 3:
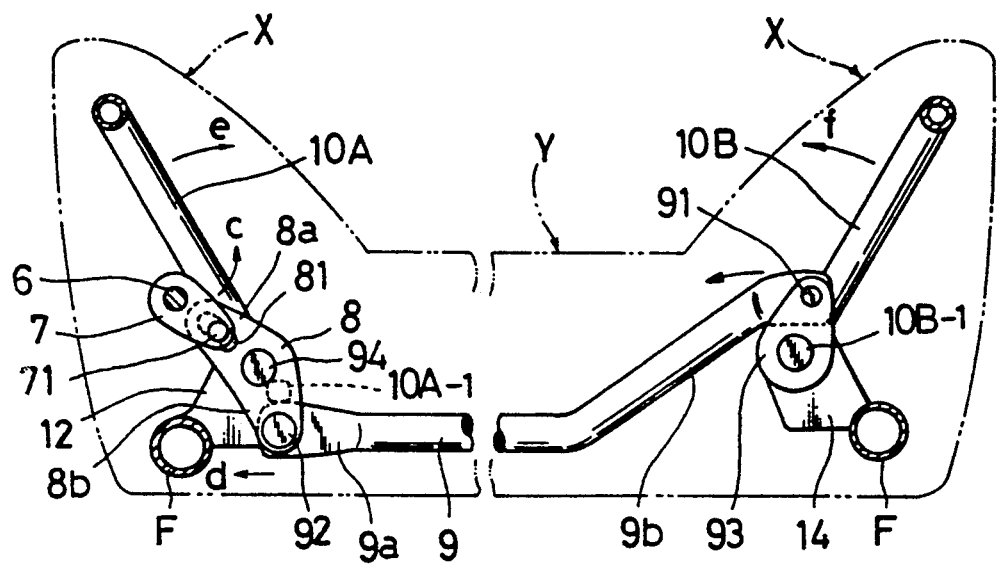
FIG. 3 is a partly broken sectional view taken along the line III—III in FIG. 1.

As best shown in FIG. 3, the actuator plate (8) is formed in a generally triangular shape, having a pair of opposite ends relative to the pin (94), wherein, as viewed from FIG. 3, the upper one of those two ends of actuator plate (8) is formed with an elongated hole (81). As also viewed from the same FIG. 3, the abovementioned link piece (7), stating specifically, is fixed to the shaft (6) at the upper end thereof, and is further provided with a pin (71) at the lower end thereof, which pin (71) is slidably inserted through the elongated hole (81) of actuator plate (8). On the other hand, the lower end of actuator plate (8) has a pin (92) fixed thereto.

As viewed once again from FIG. 3, one end (10A-1) of the right-side side support frame (10A) is fixed to the outward surface of actuator plate (8) as indicated by the phantom line in the FIG. 3. In this respect, more specifically, the side support frame end (10A-1) is fixed at the lower end portion of actuator plate (8) adjacent to the pin (92), which lies opposite to the upper end of the same plate (8), to which is connected the shaft (6) via the link piece (7) as stated earlier. With regard to the left-side side support frame (10B), its one end (10B-1), which is rotatably supported by the bracket (14), is fixed to the base end of a link (93), and the upper free end of that link (93) is provided with a pin (91). With this structure, the connecting rod (9) is extended between the actuator plate (8) on the right side and the link (93) on the left side. That is, as in FIG. 3, the connecting rod (9) has, defined therein, a lowered horizontal rod section (9a) and raised rod section (9b), and the end of the former section (9a) is rotatably connected to the pin (92) associated with the actuator plate (8), while the end of the latter section (9b) is rotatably connected to the pin (91) of the link (93). Preferably, the pin (92) of actuator plate (8) should be located at the same level with the seat back frame (F), and the lowered horizontal rod section (9a) be extended horizontally on the same plane with the frame (F) as far as possible toward the end of such raised rod section (9b) which is connected to the link (93). This advantageously avoids a hard touch of the connecting rod (9) to the back of an occupant on the seat.

Figure 4:
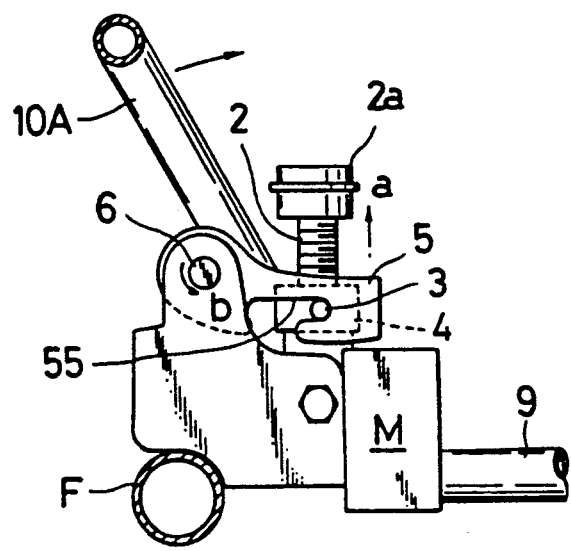
FIG. 4 is partially sectional view taken along the line IV—IV in FIG. 1.

With the above-described structure, when the motor (M) is driven to cause the lead screw (2) to rotate for moving the nut member (4) therealong upwardly as indicated by the arrow (a) in FIG. 4, the arm (5) is rotated upwardly relative to the center of rotation at (b), thus causing the shaft (6) to be rotated in the counterclockwise direction of arrow (b) in FIG. 4. This rotation of shaft (6) leads to the simultaneous counterclockwise rotation of the link piece (7) as indicated by the arrow (c) in FIG. 3, so that the actuator plate (8) is caused also to be rotated in the same direction about the center of rotation (94); in other words, the lower end of the actuator plate (8) is rotated thereabout in the clockwise direction, which in turn causes the right-side support frame (10A) to rotate about the same rotation center (94) in the inward direction of arrow (e) in FIG. 3, while at the same time, the connecting rod (9) is displaced in the right direction as indicated by the arrow (d) as viewed from FIG. 3. Then, the link (93) at the opposite seat back lateral frame section is caused to be rotated clockwise by that right-wise displacement of connecting rod (9), whereby the end (10B-1) of the left-side side support frame (10B) is rotated about the its central axis upon the bracket (14) in the same clockwise direction as indicated by the arrow (f). Thus, as is apparent from FIG. 3, both right-side and left-side side support frames (10A) (10B) are moved inwardly towards each other for placing the respective corresponding side portions (X) (X) of seat back in a closed state relative to the central portion (Y) thereof, so that an occupant on the seat can increase the side support force to his or her both lateral sides of body. To move the side portions (X) (X) of seat back in an open direction, on the contrary (as indicated by the two-dot chain line in FIG. 2), the motor (M) should be driven reversely for causing downward movement of the nut member (4) along the lead screw (2) so as to execute reverse motions of the same elements above (6, 7, 8, 9, . . . ).

Accordingly, in accordance with the present invention, the motor (M) is disposed adjacently alongside of one lateral frame section of seat back frame (F) and the unit of lead screw and nut member (2) (4) is arranged on that lateral frame section in an erecting state under the one side support frame (10A). Likewise, the arm (5) is disposed adjacent to and above the same seat back lateral frame section. These collective dispositions of major drive mechanical elements along and vertical to one lateral frame section of seat back frame (F) are indeed effective for avoiding contact of those elements with the back of an occupant on the seat, thus eliminating the hard touch problem found in the prior art.

While having descrbied the present invention as above, it should be understood that the invention is not limited to the illustrated embodiment, but any other modifications, replacements and additions may be applied thereto structurally without departing from the scopes of the appended claims.

What is claimed is:

1. A side support device in a seat back of an automotive seat, comprising:
    a seat back frame having a pair of lateral frame sections;
    a pair of side support frames, each being rotatably mounted on one of said pair of lateral frame sections of said seat back frame;
    a drive mechanism disposed at one of said pair of lateral frame sections of said seat back frame, said drive mechanism including:
    a motor;
    a lead screw connected operatively with an output shaft of said motor, said lead screw being so disposed as to extend generally vertically relative to said one of said pair of lateral frame sections;
    a nut member in a threaded engagement with said lead screw, said nut member having a pin provided therewith;
    an arm means having two ends, wherein one end is engaged with said pin of said nut member;
    a first bracket fixed on said one of said pair of lateral frame sections,
    a shaft which is rotatably supported on said first bracket, wherein another end of said arm means is fixed to said shaft;
    a link means having a base end fixed to a free end of said shaft;
    a second bracket fixed on said one of said pair of lateral frame sections;
    an actuator plate which is rotatably supported on said second bracket, said actuator plate having one end portion coupled operatively to a free end of said link means, and having another opposite end portion to which one end of one of said pair of side support frames is fixed;
    a connecting rod extended between said pair of side support frames, said connecting rod having one end pivotally connected to another end portion of said actuator plate and having another end operatively connected to another of said pair of side support frames; and
    wherein operation of said motor causes both said pair of side support frames to be moved inwardly toward or outward away from each other.

2. The side support device as claimed in claim 1, wherein said first bracket is disposed inwardly of said pair of lateral frame sections of said seat back frame, and wherein, at said first bracket, there are mounted said motor, said arm means and said lead screw.

3. The side support device as claimed in claim 1, wherein said first and second brackets are disposed alongside of an inward surface of said one of said pair of lateral frame sections of said seat back frame, wherein said first bracket is disposed upon said one of said pair of lateral frame sections, and wherein said free end of said shaft extends from its rotatable support by said first bracket and further extends above and along said one of said pair of lateral frame sections for fixation to said base end of said link means.

4. The side support device as claimed in claim 1, wherein said connecting rod comprises a lowered rod section having said one end thereof and a raised rod section having said another end thereof, wherein there is fixed a bracket upon another of said pair of lateral frame sections of said seat back frame, which bracket is adapted for rotatably receiving one end portion of said another of said pair of side support frames, and wherein a link is fixed to such one end portion of said another of said pair of side support frames, to which link is pivotally connected said another end associated with said raised rod section of said connecting rod.

* * * * *